United States Patent [19]
Kikuchi et al.

[11] Patent Number: 5,007,712
[45] Date of Patent: Apr. 16, 1991

[54] OPTICAL PICK-UP UNIT

[75] Inventors: Ikuya Kikuchi; Ryo Sato, both of Tokorozawa, Japan

[73] Assignee: Pioneer Electronic Corporation, Tokyo, Japan

[21] Appl. No.: 234,547

[22] Filed: Aug. 22, 1988

[30] Foreign Application Priority Data

Jan. 21, 1988 [JP] Japan .................. 63-6061[U]

[51] Int. Cl.$^5$ .............................................. G02B 7/02
[52] U.S. Cl. ...................... 350/255; 350/247; 369/44.15
[58] Field of Search .............. 350/255, 247, 257; 369/44, 45, 46, 44.14, 44.15

[56] References Cited

U.S. PATENT DOCUMENTS

| | | | |
|---|---|---|---|
| 4,592,037 | 5/1986 | Ohnuki | 350/255 |
| 4,596,444 | 6/1986 | Ushida | 350/247 |
| 4,596,448 | 6/1986 | Kikuchi | 350/247 |
| 4,679,904 | 7/1987 | Kurihara | 350/255 |
| 4,720,088 | 1/1988 | Tamura | 350/247 |
| 4,750,164 | 6/1988 | Nose | 369/45 |
| 4,767,187 | 8/1988 | Gijzen et al. | 350/247 |

FOREIGN PATENT DOCUMENTS 60-197942 10/1985 Japan .................. 350/247

Primary Examiner—Bruce Y. Arnold
Assistant Examiner—Loha Ben
Attorney, Agent, or Firm—Fleit, Jacobson, Cohn, Price, Holman & Stern

[57] ABSTRACT

In an optical pick-up unit, there is provided with a structure for supporting a holder holding at least an objective lens through a spring support assembly so that said holder is movable in both of a focusing direction and a tracking direction, carried on a carriage capable of traveling at a high speed in the tracking direction, a spring constant of the spring support assembly is so set as to be larger in the tracking direction than in the focusing direction, whereby an amount of a positioning error of the objective lens produced in the tracking direction when the carriage is driven at a high speed is reduced. As a result, by the thus reduced amount of the positioning error of the objective lens, the optical pick-up unit is improved in access time in comparison with the conventional optical pick-up unit.

2 Claims, 3 Drawing Sheets

OPTICAL PICK-UP UNIT

BACKGROUND OF THE INVENTION

1. Field of the Invention

The present invention relates to an optical pick-up unit, and more particularly to one provided with a holder holding an objective lens etc. supported by spring members, the object lens being movable in both of a focusing direction and a tracking direction.

2. Description of the Prior Art

An optical pick-up unit of an information recording/reading apparatus for recording or reading information from a disc-shaped recording medium (hereinafter referred to as the disc) is carried on a carriage which is rectilinearly movable in a radial direction of the disc. In general, a rotary motor is used as a prime mover for the carriage. A torque of the rotary motor is transmitted to the carriage through a suitable gear-reducer mechanism, for example such as one constructed of a rack and a pinion.

In the information recording-reading apparatus, since the rotary motor has a limitation in its responsibility, the apparatus has a limitation in its quick-access ability for driving the optical pick-up unit at a high speed to position the unit on a desired recording track of the disc. Consequently, there is a strong demand for a quick-access information recording/reading apparatus having an optical pick-up unit. In recent years, in order to realize such quick-access information recording/reading apparatus, there is employed a linear motor as a means for driving the optical pick-up unit of the apparatus, the linear motor being excellent in responsiveness.

As shown in FIG. 1, in the optical pick-up unit, a holder 1 holding therein an objective lens (not shown) is supported by a conventional biaxial-support structure constructed of a base mount 3 and four pieces of wire-like spring members 2a, 2b, 2c and 2d which are parallel to one another. The biaxial-suport structure supports the holder 1 through the spring members 2a, 2b, 2c and 2d so as to be movable in two perpendicular directions, i.e., in an optical-axis direction "A" or focusing direction and in a direction "B" or tracking direction perpendicular to the optical axis direction "A". The objective lens functions to converge an optical beam passed through a hole 3a formed in the base mount 3 toward an optical disc (not shown).

As described above, in the conventional biaxial-support structure suporting the holder 1 through the four pieces of the spring members 2a, 2b, 2c and 2d parallel to one another, a minimum resonant frequency f0 of the holder 1 in the focusing direction "A" is the same as that of the holder 1 in the tracking direction "B". However, since a focusing servo-mechanism of the optical pick-up unit moves into its retracted position in operation, it is difficult to set the minimum resonant frequency $f_o$ of the holder 1 in the focusing direction "A" at a high level. Consequently, in the conventional biaxial-support structure, it is natural to set the minimum resonant frequency of the holder 1 at a low level or low frequency.

In case that a linear motor is employed as a means for driving the optical pick-up unit having the biaxial-support structure so as to realize a quick-access information recording/reading apparatus having the optical pick-up unit, an external force exerted by the carriage acts on the holder 1 through the wire-like spring members 2a, 2b, 2c and 2d since the carriage carrying the optical pick-up unit is operated under a condition that the focusing servo is actuated while the tracking servo is not actuated. In this case, the minimum resonant frequency $f_o$ of the holder 1 in the tracking direction is low. This means that an assembly of the spring members 2a, 2b, 2c and 2d of the optical pick-up unit is low in its spring constant in the tracking direction. Consequently, the objective lens in the holder 1 is moved to a position slightly deviated from its neutral position when the quick-access operation of the optical pick-up unit is conducted, whereby a positioning error is produced at this time. Due to the existence of such positioning error or a positioning error caused in a tracking-error detection system employing a push-pull method and the like, the conventional optical pick-up unit is poor in convergency on a desired track of the disc to take much access time therefor.

SUMMARY OF THE INVENTION

It is an object of the present invention to provide an optical pick-up unit having a biaxial-support structure capable of providing quick access.

According to the present invention, there is provided: an optical pick-up unit comprising an objective lens, a spring means for supporting the objective lens and a base mount for supporting the objective lens through the spring members, the improvement wherein: the optical pick-up unit is carried on a carriage capable of traveling at high speed in a tracking direction; and the objective lens is supported by the spring means so as to be swingable in both of a focusing direction and the tracking direction, a spring constant of the spring means being larger in the tracking direction than in the focusing direction.

DESCRIPTION OF THE PREFERRED EMBODIMENT

Now, an embodiment of the present invention will be described hereinbelow in detail with reference to the drawings.

Figure 2:
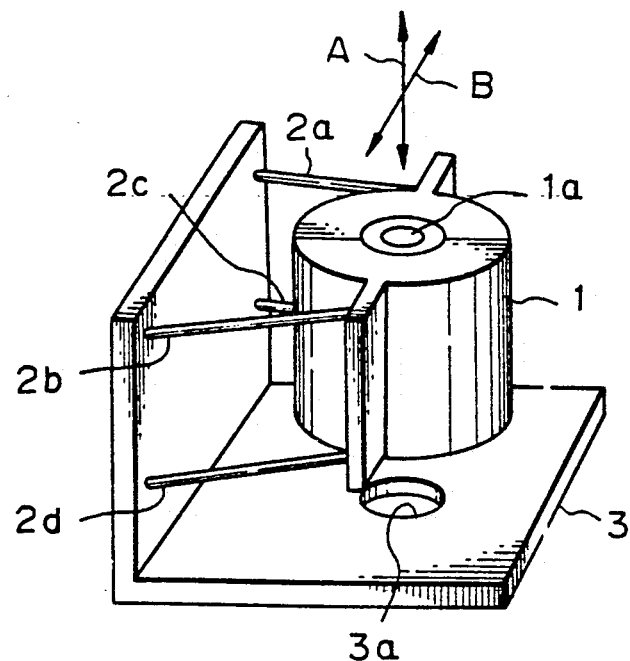
FIG. 2 is a perspective view of the optical pick-up unit according to the present invention, illustrating the biaxial-support structure of the optical pick-up unit.
Figure 3:
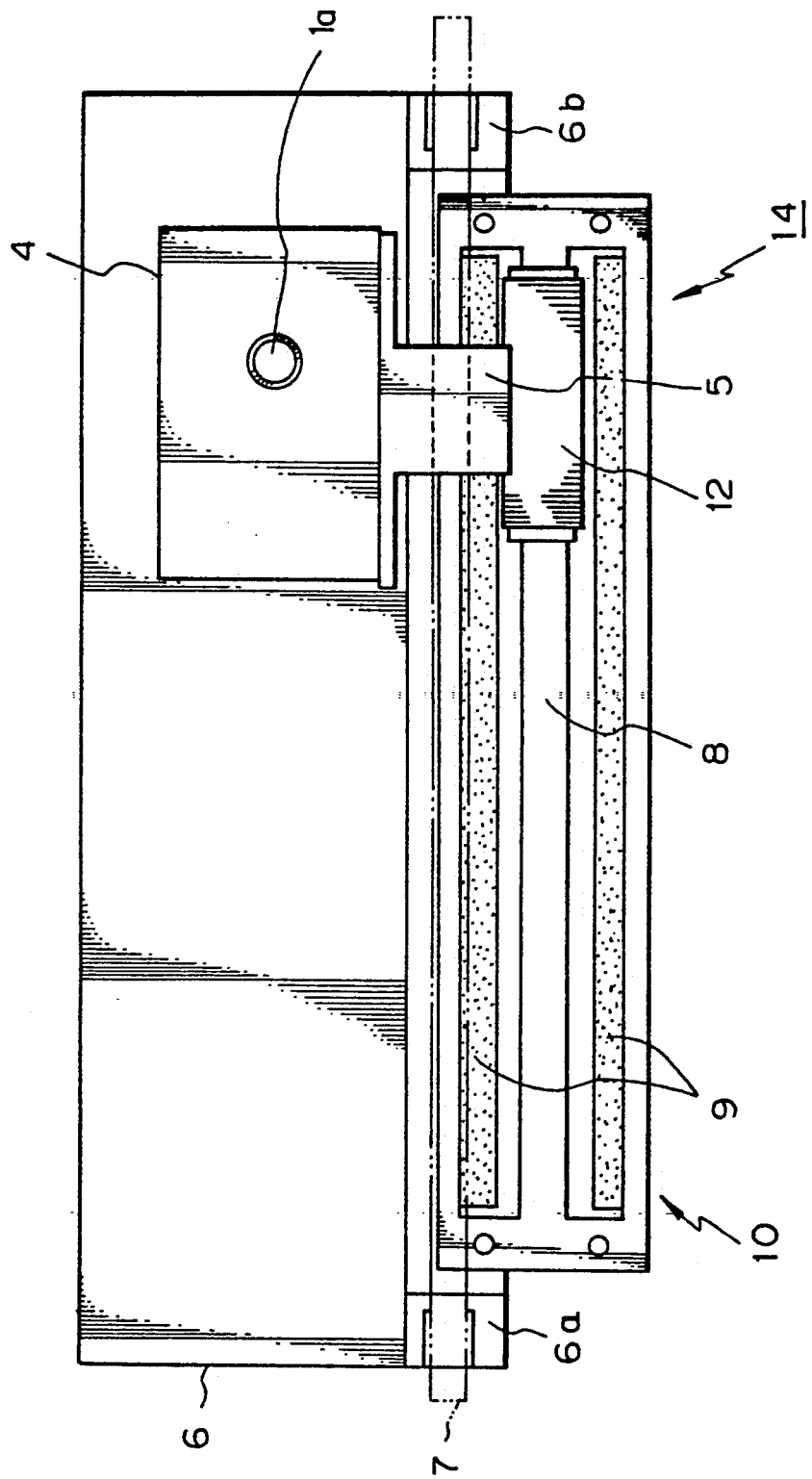
FIG. 3(A) is a plan view of the linear motor serving as a means for driving the optical pick-up unit according to the present invention.
FIG. 3(B) is a side view of the linear motor shown in FIG. 3(A).
Figure 3B:
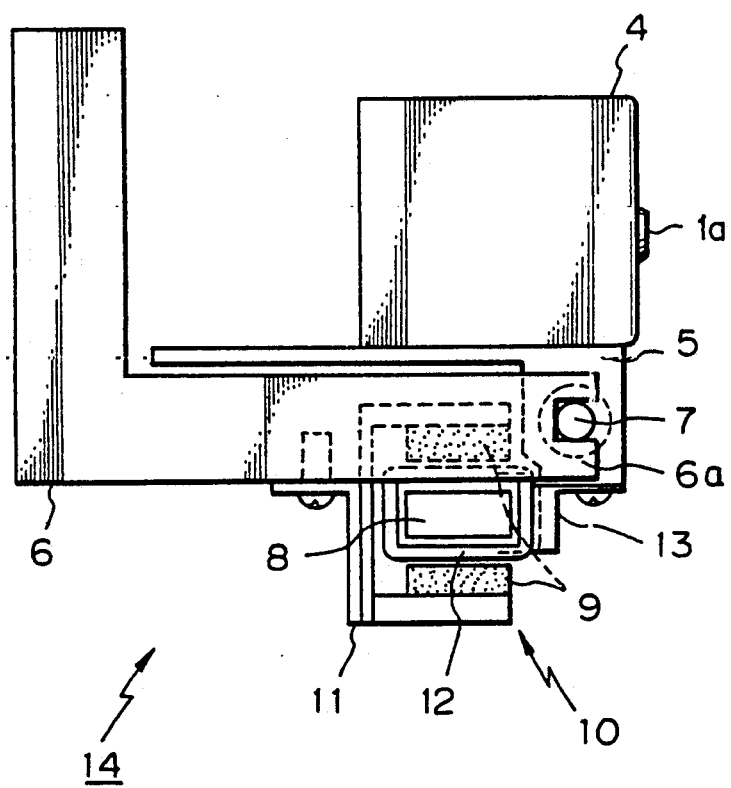

In FIG. 2 in which a biaxial-support structure of an optical pick-up unit of the present invention is shown, a holder 1 holding therein an objective lens is supported on a base mount 3 through a four pieces of wire-like spring members 2a, 2b, 2c and 2d so as to be swingable in both a focusing direction "A" and a tracking direction "B". Each pair of the spring members 2a, 2b, 2c and 2d are disposed in each plane perpendicular to the focusing direction "A". Each of the spring members 2a, 2b, 2c and 2d is constructed of a spring or a wire prepared through an etching process. In the embodiment of the present invention shown in FIG. 2, a pair of the spring members 2a and 2b are disposed in a front mutual plane perpendicular to the focusing direction "A", while the other pair of the spring members 2c and 2d are disposed in a rear mutual plane which is parallel to the front mutual plane and perpendicular to the focusing direction "A". As is clear from FIG. 2, the spring members 2a and 2b are more spaced apart from each other at their end portions adjacent the base mount 3 than at their end portions adjacent the holder 1. In the same way, the spring members 2c and 2d are more spaced apart from each other at their end portions adjacent the base mount 3 than at their end portions adjacent the holder 1. As a result, a spring constant of an assembly of the spring members 2a, 2b, 2c and 2d is larger in the tracking direction "B" than in the focusing direction "A". As shown in FIGS. 3(A) and 3(B), the thus constructed optical pick-up unit 4 having the biaxial-support structure is carried on a carriage 5.

In the embodiment of the present invention shown in FIGS. 3(A) and 3(B), the carriage 5 is movably engaged with a guide rail 7 which is supported at opposite supporting portions 6a and 6b of a base 6. A magnetic circuit 10, which is constructed of a yoke 8 and a magnet 9 and has an elongate shape forming a magnetic-field area extending along a traveling direction of the carriage 5, is fixedly mounted on the base 6 through a mounting plate 11. A movable coil 12 is supported by a coil holder 13 so that at least one part of the movable coil 12 is positioned in the magnetic-field area of the magnetic circuit 10 in a side opposite to the optical pick-up unit 4 with respect to the guide rail 7. A movable-coil type linear motor 14 is constructed of the magnetic circuit 10 and the movable coil 12, and drives the optical pick-up unit 4 in the tracking direction "B" or radial direction of the disc through the carriage 5.

Figure 1:
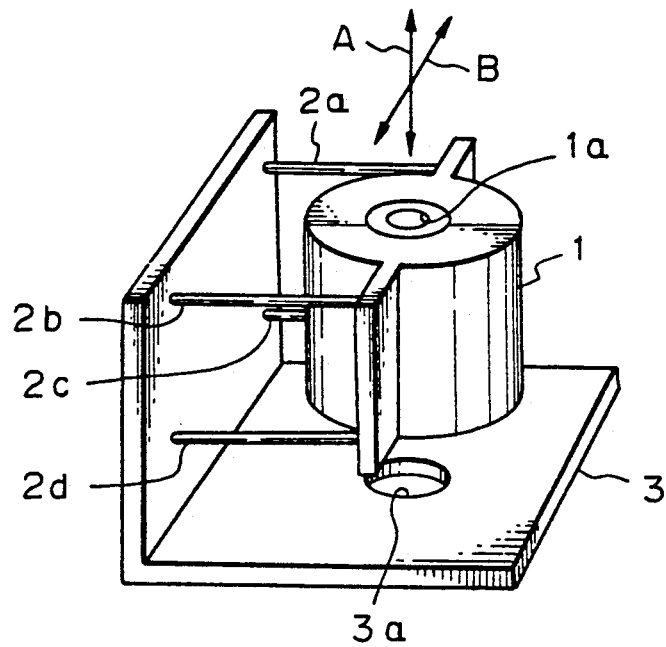
FIG. 1 is a perspective view of the conventional optical pick-up unit having the conventional biaxial-support structure.

In the optical pick-up unit 4 employing the thus constructed linear motor 14, the carriage 5 is good in responsibility so as to be precisely operated during the tracking operation since the linear motor 14 is excellent in its responsibility. Consequently, load is supported by the carriage 5 in a low frequency area of the tracking servo while supported by the four pieces of wire-like spring members 2a, 2b, 2c and 2d in a high frequency area thereof. In addition, in the biaxial-support structure of the optical pick-up unit shown in FIG. 2, a spring constant of an assembly of the four pieces of wire-like spring members 2a, 2b, 2c and 2d is larager in the tracking direction "B" than in the focusing direction "A". Consequently, it is possible to decrease a positioning error of the objective lens in the holder 1 deviated from a neutral position of the objective lens 1a even when the carriage 5 is moved at a high speed to realize quick-access operation of the optical pick-up unit 4, whereby it is possible to reduce access time for a desired track of the disc in comparison with the biaxial-support structure employed in the conventional optical pick-up unit shown in FIG. 1.

As described above, in the optical pick-up unit of the present invention, since the spring constant of the assembly of the spring members for supporting the objective lens is larger in the tracking direction than in the focusing direction, it is possible to reduce the amount of the positioning error of the objective lens produced in the tracking direction when the carriage of the optical pick-up unit is driven at a high speed in quick-access operation. Consequently, by the thus reduced amount of the positioning error, the optical pick-up unit of the present invention is superior in access time to the conventional optical pick-up unit.

Furthermore, it is to be understood that the holder 1 may hold not only the objective lens but also other optical elements such as a beam splitter and an optical beam source, if preferred.

What is claimed is:

1. An optical pick-up unit mounted on a pick-up carriage of an optical disc player, said pick-up unit comprising:
   a holder for holding an objective lens having an optical axis passing therethrough;
   a base mount mounted on said pick-up carriage;
   resilient support means for resiliently supporting said holder so that said holder can be translated in each of a focusing and a tracking direction relative to said base mount, said focusing direction being parallel to the optical axis of said lens and said tracking direction being transverse to said focusing direction; and
   wherein said resilient support means comprises first and second pairs of resilient filamentary members interconnecting between said base mount and said holder, said filamentary members each being of equal length and attached to said holder at points equidistant from said optical axis of said lens, said points lying in a plane which passes through the optical axis of said lens, said first pair of filamentary members being disposed in a first plane perpendicular to the focusing direction, and said second pair of filamentary members being disposed in a second plane spaced from and parallel to said first plane and perpendicular to the focusing direction, the filamentary members within each of said first and second pairs being spaced apart from one another on said base mount and said holder, and wherein, a greater distance separates the filamentary members with respect to each of said first and second pairs on the base mount than on the holder.

2. An optical pick-up unit mounted on a pick-up carriage of an optical disc player, said pick-up unit comprising:
   a holder for holding an objective lens having an optical axis passing therethrough, said holder having first and second extension members on direct oppostie sides of said optical axis from each other which extend along a length of said holder, said first and second extension members lying in a common plane entirely containing said optical axis;
   a base mount mounted on said pick-up carriage and comprising a first wall being parallel to said common plane passing through said optical axis of said lens and each of said first and second extension members of said holder, and a second wall connected and transverse to said first wall;
   resilient support means for resiliently supporting said holder so that said holder can be translated in each of a focusing direction and a tracking direction relative to said base mount, said focusing direction being parallel to said optical axis and said trackintg direction being transverse to said focusing direction;
   said resilient support means comprising first, second, third and fourth resilient filamentary members interconnecting between the first wall of said base mount and said holder, the first and second filamentary members being attached to said holder at said first and second extension members, respectively, and lying in a first common plane, the third and fourth filamentary members being attached to said holder at said first and second extension members, respectively, and lying in a second common plane which is parallel to and spaced from said first common plane, the first and second filamentary members being attached to the first wall of said base mount and separated from each other by a distance which is greater than that which separates said first and second filamentary members on said holder, and the third and fourth filamentary members being attached to the first wall of said base mount and separated from each other by a distance which is greater than that which separates said third and fourth filamentary members on said holder.

* * * * *